United States Patent [19]

Hedtke

[11] Patent Number: 4,952,081

[45] Date of Patent: Aug. 28, 1990

[54] MANUAL ROTARY SPHERE CONTROL OF AN ELECTRONIC EQUIPMENT WITH TOUCH SENSING OF SCALE MARKS

[75] Inventor: Rolf Hedtke, Darmstadt, Fed. Rep. of Germany

[73] Assignee: BTS Broadcast Television Systems GmbH, Darmstadt, Fed. Rep. of Germany

[21] Appl. No.: 390,613

[22] Filed: Aug. 7, 1989

[30] Foreign Application Priority Data

Aug. 20, 1988 [DE] Fed. Rep. of Germany ....... 3828416

[51] Int. Cl.[5] ....... H02P 7/00

[52] U.S. Cl. ....... 388/825; 318/6; 340/710

[58] Field of Search ....... 340/407, 706, 709, 710; 388/825; 318/6, 7; 74/471 XY; 364/188, 190

[56] References Cited

U.S. PATENT DOCUMENTS

| | | | |
|---|---|---|---|
| 3,895,358 | 7/1975 | Pearl | 340/709 X |
| 4,687,444 | 8/1987 | Garner | 340/407 X |
| 4,748,441 | 5/1988 | Brzezinski | 340/706 X |
| 4,797,665 | 1/1989 | Ida et al. | 340/706 X |
| 4,868,549 | 9/1989 | Affinito et al. | 340/709 X |

FOREIGN PATENT DOCUMENTS

| | | | |
|---|---|---|---|
| 3428045 | 1/1986 | Fed. Rep. of Germany | 340/710 |
| 60-179821 | 9/1985 | Japan | 340/710 |
| 1061657 | 3/1967 | United Kingdom | 340/710 |

*Primary Examiner*—Bentsu Ro

*Attorney, Agent, or Firm*—Frishauf, Holtz, Goodman & Woodward

[57] ABSTRACT

A sphere which may be rotationally displaced by manual action, protruding from a control panel, is mechanically connected for resolving its rotary motion into motions about two axes perpendicular to each other, for control of the direction and speed operation of a video recorder and playback equipment. When any of several particular rotary displacements of the sphere have taken place, a controllable brake system bears on the mechanical coupling between the sphere and at least one of in the electronic transducers to exert a brake torque to simulate an index position. One such position is a neutral setting or "rest position". The y axis is used for gradual speed change and the x axis is used for stepwise speed change. The axis for gradual speed change has an initial threshold on each side of the rest position to determine direction. On the other axis, the speed steps may be separate for each direction, respectively on opposite sides of the rest position.

5 Claims, 2 Drawing Sheets

1
4
2
5
3
6
8
7
9
M
M
M
10
20
23
19
21
22
13
15
y
y
17
16
x 11
14
18
x

MANUAL ROTARY SPHERE CONTROL OF AN ELECTRONIC EQUIPMENT WITH TOUCH SENSING OF SCALE MARKS

The present invention concerns a manual control of electronic equipment by manual rotary displacement of a sphere coupled to transducers and also a magnetic tape recording and/or playback equipment having such a manual control of tape transport direction and velocity.

Manual control devices utilizing a sphere rotatable in any direction in place are already known as control devices for carrying on a dialogue with a computer In these known manual input devices angle step transducers responsive to rotary displacement of the sphere measure the displacement about respective x and y axes at right angles to each other, which correspond to movement on a display monitor in x and y directions which are likewise at right angles. A serial data signal is derived by pulse shaping or modification of the signals obtained from the angle step transducers and that serial data signal controls the movement of a cursor on the display screen of the monitor of the computer.

In the case of a rotary manual control utilizing a knob that can be turned about a fixed axis for selecting different operating conditions, it is known from a copending U.S. patent application Ser. No. 07/015,290, filed Feb. 17, 1987, now U.S. Pat. No. 4,859,922; issued Aug. 22, 1989 to release a supplementary spoke function for controlling these different operating conditions by torsion. The rotary knob is so constituted that direction of twist, angular deviation and spoke function are detected and supplied to electronic processing means. The electronic processing supplies the actual control commands to the device to be controlled. At the same time a feedback report to the operator for simulation of indexed points during the twisting of the operating knob is provided.

In contrast to the fixed-axis knob, the movement of a rotary sphere control of the known type presents an infinite plane. In the same measure as the movement of the manually rotatable sphere is carried out, a cursor is positioned on the display screen and any type of movements in the entire plane is possible. A fixed-axis rotary knob can produce only in a limited way the functions of a rotary sphere control.

SUMMARY OF THE INVENTION

Briefly, a manual ball-type control is used for control of the tape transport mechanism of a magnetic tape recording and/or playback apparatus. By means of controllable brakes, discernable points and lines are provided where the rotary movement of the control tends to stop. These may be called "index" points or lines even though the control does not lock in them. Particular index points, for example a neutral position, can even be particularly emphasized by choice of a different level of torque to be overcome.

In the control of a magnetic tape equipment both the x axis and the y axis may advantageously be used for control of tape direction and speed with a rest position between the two directions, while normal speed can be represented by a circle equidistant from the rest position and the difference between the x and y axes may be that the x axis is used for smoothly variable change of tape speed, while the y axis is used for stepwise changes of tape speed. The arrival at each step boundary in the y direction may be indexed in accordance with the invention. In another aspect of the invention only one axis, for example the y axis, is used for control of the tape direction. Even then, the y axis can also be used for stepwise changes of speed after performing a preliminary direction-determining displacement from the rest position.

BRIEF DESCRIPTION OF THE DRAWINGS

The invention is further described by way of illustrative example with reference to the annexed drawings, in which.

DESCRIPTION OF THE ILLUSTRATED EMBODIMENTS

Figure 1:
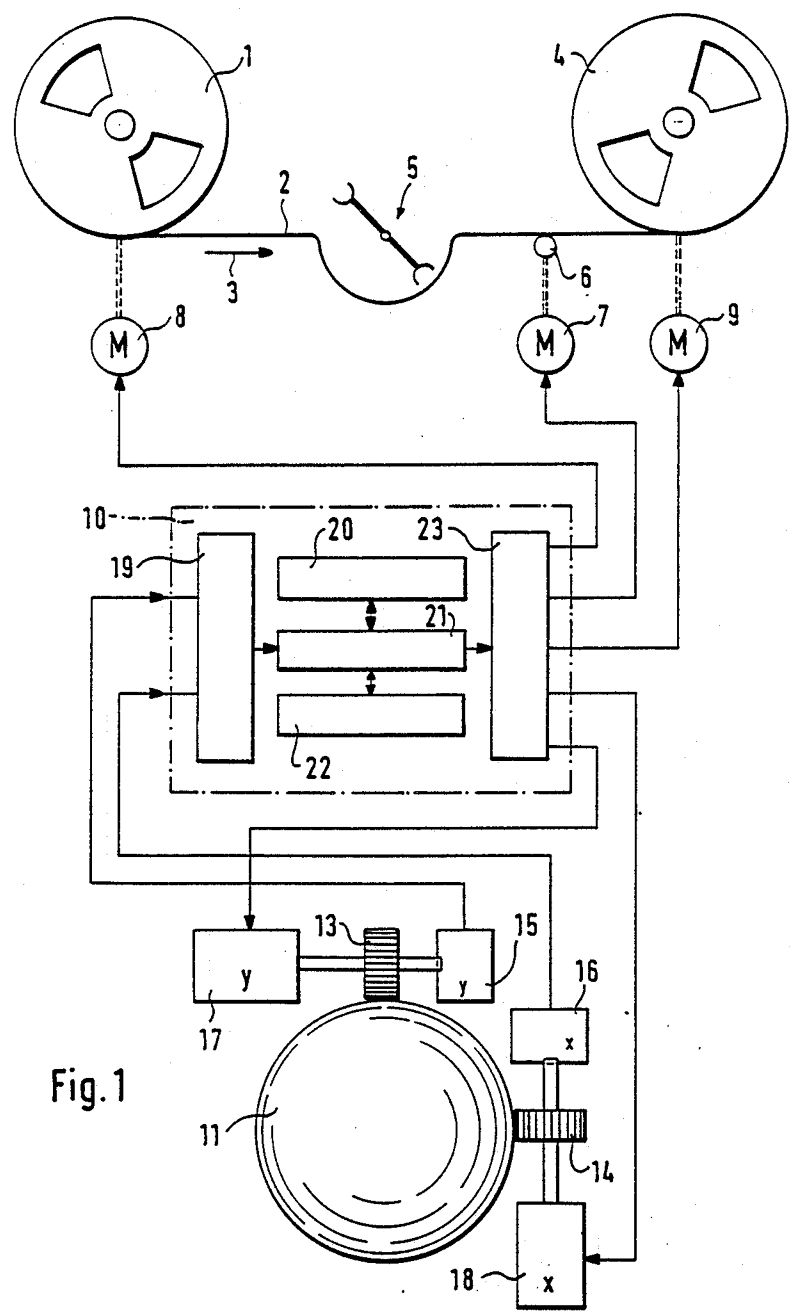
FIG. 1 is a basic block circuit diagram showing a manual control according to the invention installed in a magnetic tape equipment.

FIG. 1 shows a magnetic tape 2, wound on a supply reel 1 which is moved in the direction of an arrow 3 and eventually is wound up again on a takeup reel 4. The magnetic tape, on its way to the takeup reel 4, loops helically around a scanning device 5, so that tracks are scanned which run obliquely to the edge of the magnetic tape 2. The advance of the magnetic tape 2 is produced by a shaft 6 driven by a motor 7. A motor 8 is provided for driving the supply reel 1 and a motor 9 for driving the takeup reel 4. The motors 7, 8 and 9 serving for transport of the magnetic tape 2 are controlled and regulated in speed by a microcomputer 10.

Figure 2:
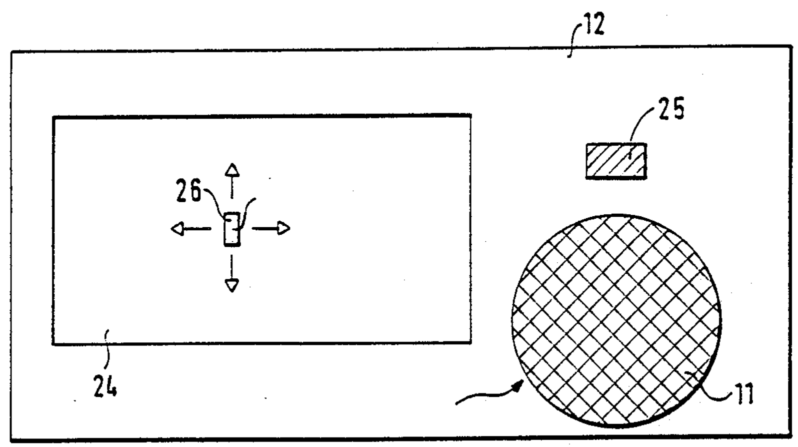
FIG. 2 is a face view of the operating panel containing a manual control according to the invention.

The microcomputer 10 is itself controlled by a rotary sphere 11 which is located in a control panel 12 illustrated in FIG. 2. The surface of the rotary sphere 11 is connected in force-transmitting fashion respectively in x and y directions defined by the control panel by respective direction couplings 13 and 14. These couplings can for example consist of rollers having a rubber coating In an actual embodiment such rollers provide a bearing for the control sphere 11 and they may be provided in oppositely located pairs with two idler rollers helping to seat the sphere, although supports other than the coupler rollers may be provided by bearings of other kinds.

The friction couplings 13 and 14 are mechanically connected with respective pulse generators 15 and 16 and with respective controllable braking devices 17 and 18. Suitable devices for service as the pulse generators 15 and 16 are incremental transducers which produce a particular number of pulses in a manner dependent upon particular angular displacement. These pulses are supplied through an input interface 19 of the microcomputer 10, which is designated by a chain-dotted line frame within which various units of the microcomputer are shown. Processing unit 20 processes these pulses in accordance with a program stored in a memory 22 in such a way that signals are produced at an output interface 23 for controlling a control unit 21. These signals control the motors 7, 8 and 9 and the braking devices 17 and 18 in accordance with the program.

In the plan view of a control panel shown in FIG. 2, for example, two thirds of the surface of the control sphere 11 are located on the inside of a casing not shown in the drawing, so that about one third of the spherical surface is available for manual adjustment purposes. The control panel has a data display device 24 next to the control sphere 11 and also a changeover switch 25. This changeover switch 25 can be used to permit manipulation of a cursor (not shown) on the face of the data display device 24 or else, in the other position of the switch, to control the tape transport mechanism of the magnetic tape recording and/or playback equipment with respect to the speed and direction of the transport of tape around the scanning device 5.

Professional magnetic tape equipment for recording and playback of video signals are usually equipped with data display devices 24 in a control panel 12 in order to show to operating personnel various selectable data or else to enable them to supply data by means of the control panel equipment itself It is therefore desirable to provide a simple and visually convenient control panel. On the other hand, in the processing of picture sequences much value is ascribed to the possibility of quickly (and with easily operable means) seeking and finding particular picture scenes or picture scene transitions.

Figure 3:
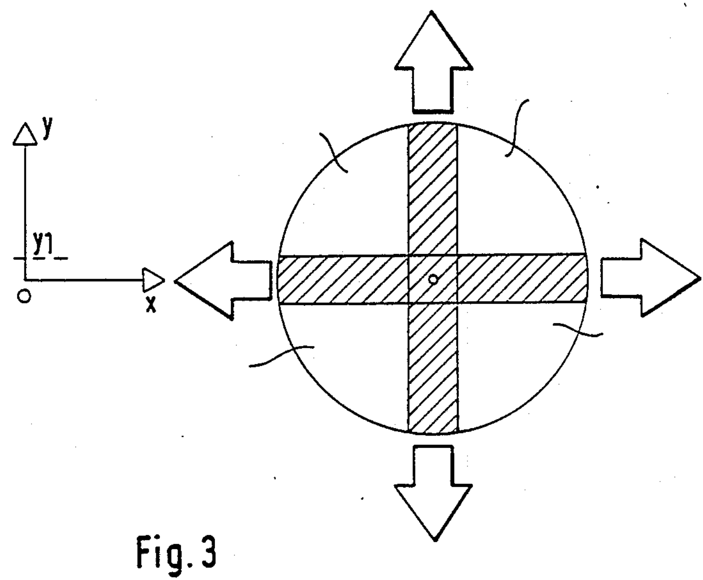
FIG. 3 is a schematic representation of the manner of manual control of the mode of operation of the tape transport mechanism of a magnetic tape equipment.

If the manually operable sphere 11 is switched by the changeover switch 25 to control the tape transport mechanism of the magnetic tape equipment, the rotary movement of the sphere in the x direction, which is shown horizontally in FIG. 3, and to the right signifies an increase in the tape speed of the playback device in the forward direction and to the left the same significance for the reverse direction. In the y direction, shown vertically in FIG. 3, rotary movement of the sphere 11 produces successive steps of forward movement speed. In the opposite y direction (and downwards in FIG. 3) the television pictures are shown in backwards sequence, with step-up of speed at successive discrete y values. Diagonal movements of the sphere, providing simultaneous components of x and y values, signify different slow-motion speeds that become faster with outward movements away from the indexed neutral position of the sphere, with all step-wise accelerations indexed in accordance with the invention.

In operation of a magnetic tape equipment it is desirable to separate, even in manipulation, the different modes of operation for control of the tape and to be able to recognize particularly clearly, on the control panel itself, a stopping of the magnetic tape. According to a further development of the invention, two preferred directions in a narrow x and y region are defined. In order to reach into the operating condition on the boundary of this region, the program of the microcomputer 10 is so constituted that a resistance which can be felt by the operator must be overcome by rotary displacement of the sphere for that result. A neutral position or zero point is likewise marked by a resistance that can be felt. A resistance that can be felt by a person making adjustments with the sphere 11 simulates index points or lines by means of the electrically controllable brakes 17 and 18. If during a movement of the sphere 11 in the x direction the number of y pulses generated by the pulse generator 15 during a unit of time exceeds a predetermined boundary value which corresponds to the maximum extent of the motor range control, a braking torque in the y direction is produced for the control of the microcomputer 10, so that in this (y) direction a resistance arises which can be strongly felt. The same applies for the other direction. When the neutral position (zero point) is reached, both brakes 17 and 18 are activated. A final position can likewise be marked, for example in order to show that maximum tape transport speed of the tape 2 has been reached.

If by switching over of the switch 25 the control sphere 11 is allocated to the data display device 24, a cursor 26 can then be positioned by the sphere 11 in a manner dependent upon rotary movement of the sphere. It has been found helpful to make it possible to feel when the cursor has come into a particular data field in order to make possible a reliable input of data to that field.

In the above-described illustrative example the use of the indexed spherical manual control of this invention has been described with reference to a magnetic tape equipment. Of course the use of the control assembly of the invention is not limited to the purpose of controlling magnetic tape devices. Other kinds of electronic equipment can be manually controlled by the control assembly of the invention with the provision of index points or lines for recognition of particular boundary situations corresponding to program provisions for the microcomputer 10.

It will therefore be seen that although the invention has been described with reference to a particular illustrative example, variations and modifications as well as a wide variety of applications are possible within the inventive concept.

For example, the x and y axes could be used in a manner different from FIG. 3 for controlling direction and speed of a magnetic tape transport mechanism.

What is claimed is:

1. A magnetic tape equipment for recording, playback or both recording and playback of video signals, comprising a tape transport mechanism for magnetic tape (2), tape scanning means (5), and a manual control assembly including a sphere always presenting a portion of its surface so as to make it available for manual rotary displacement of the sphere in any direction and mounted so that it always presents portions of its surface respectively to two transducer mechanisms responsive to rotary movement of said sphere respectively about two axes (x, y) for generating electronic signals designating direction and velocity to be produced by control of said tape transport mechanism in response to components of rotary displacement of said sphere about corresponding axes (x, y) at right angles to each other, and further comprising:

controllable means having a braking means for braking manual rotary displacement of said sphere about each of said axes (x, y) in the neighborhood of predetermined positions of said sphere with respect to said axes, said braking means for displacement about at least one of said axes (y) being used for controlling at least the direction in which said tape is moved by said tape transport mechanism.

2. The magnetic tape equipment of claim 1 wherein means are provided for controlling said braking means in such a way so as to provide an increased resistance to the manual rotary displacement of said sphere which can be felt by an operator exerting manual control thereof in every transition between rest and either direction of tape transport.

3. The magnetic tape equipment of claim 2, wherein means are provided for control of said braking means for producing additional resistance to the rotary displacement of said sphere which can be felt by said operator manually displacing said sphere at predetermined values of tape transport velocity.

4. The magnetic tape equipment of claim 3 wherein one of said transducer mechanisms is usable, with further displacement away from a neutral position designating rest, for providing smoothly variable tape transport speeds, and the other of said transducer mechanisms is used to control direction of tape movement and control of tape speed in discrete steps.

5. The magnetic tape equipment of claim 3 further comprising electronic data display means (24) for displaying operating conditions of the magnetic tape equipment, and switching means having a position for permitting control of said tape transport mechanism by said manually displaceable sphere and control of a cursor for said data display means for data display operations controlled by the manual displacement of said sphere, said switching means being manually controllable.

* * * * *